United States Patent [19]

Blackman

[11] Patent Number: 5,548,494
[45] Date of Patent: Aug. 20, 1996

[54] LIGHT FIXTURE HAVING THE COMBINATION OF A DETACHABLE FLASHLIGHT, A NIGHT LIGHT, AND A FLUORESCENT LIGHT CONTAINED THEREIN

[76] Inventor: Stephen B. Blackman, 248 Columbia Turnpike, Florham Park, N.J. 07932

[21] Appl. No.: 526,670

[22] Filed: Sep. 11, 1995

[51] Int. Cl.⁶ ........................................ F21L 7/00
[52] U.S. Cl. .................... 362/183; 362/184; 362/228
[58] Field of Search .......................... 362/183, 184, 362/228, 230, 234

[56] References Cited

U.S. PATENT DOCUMENTS

| | | | |
|---|---|---|---|
| 1,875,956 | 9/1932 | Thiel | 362/184 |
| 3,535,506 | 10/1970 | Moore et al. | 362/184 |
| 4,357,648 | 11/1982 | Nelson | 362/183 |
| 4,432,043 | 2/1984 | Yuen | 362/184 |
| 4,590,543 | 5/1986 | Chen | 362/183 |
| 4,611,264 | 9/1986 | Bradley | 362/95 |
| 4,782,432 | 11/1988 | Coffman | 362/184 |
| 4,977,489 | 12/1990 | Fung | 362/184 |
| 5,467,258 | 11/1995 | Bamber et al. | 362/183 |

*Primary Examiner*—Denise L. Gromada
*Assistant Examiner*—Alfred Basichas
*Attorney, Agent, or Firm*—Ezra Sutton

[57] ABSTRACT

A lighting fixture for mounting under a cabinet or under a counter or on a wall area, including a housing having a device for mounting the housing under a cabinet or under a counter or on a wall area; a fluorescent light fixture mounted in the housing; a night light mounted in the housing; and a battery-operated detachable flashlight assembly removably mounted in the housing. The flashlight assembly includes a battery recharger, an electrical device, such as a male plug, for interconnecting the battery recharger and a power source, and an electrical device for sensing a power loss. The light fixture also includes a flashlight electrical connection in the housing, such as a plug receptacle, for connection to the male plug for supplying power from the power source to the detachable flashlight assembly; and one or more diffusers for the housing.

20 Claims, 9 Drawing Sheets

LIGHT FIXTURE HAVING THE COMBINATION OF A DETACHABLE FLASHLIGHT, A NIGHT LIGHT, AND A FLUORESCENT LIGHT CONTAINED THEREIN

FIELD OF THE INVENTION

The invention relates to an under cabinet/counter lighting fixture used as a standard lighting source for a room or an emergency lighting source and, more particularly, this lighting fixture includes three components being a detachable flashlight, a night light, and a fluorescent light fixture.

BACKGROUND OF THE INVENTION

Several types of multi-functional lamp fixtures, which are typically mounted on walls or ceilings, have been utilized in the past in a users home, office, or industrial plant facility. These multi-functional lamps can be used for normal operational functions; or for emergency situations involving power failures, where interior or exterior areas have no light. Such multi-functional lighting fixtures have various combinations that include: a fluorescent lamp and a spotlight; a rechargeable flashlight and a night light; a fluorescent lamp, a spotlight and an emergency strobe light; and a flashlight, a fluorescent lamp, and an emergency hazard warning light. These multi-functional lamp fixtures have the ability to be stationary, or portable, or stationary and portable, where the input power for the stationary fixture component is from an AC adaptor or AC receptacle; and the input power for the portable fixture component is from a DC adaptor or batteries.

There remains a need for a under cabinet lighting fixture which is capable of providing both normal and emergency lighting needs, where the fixture has both stationary and portable components being a detachable flashlight, a night light and a fluorescent light fixture contained within a singular housing element.

DESCRIPTION OF THE PRIOR ART

Multi-functional lamp fixtures of various designs, styles and materials of construction have been disclosed in the prior art. For example, U.S. Pat. No. 4,590,543 discloses a trilight being a fixed or portable lighting device, wherein a single light bulb acts as a night light, an emergency light, and a spotlight. The trilight is normally attached to a wall having an AC adaptor for charging the batteries. A pivotal light head can be adjusted to four angles 0°, 30°, 60°, and 90° to facilitate illumination. This patent does not disclose a portable lighting device having three different light fixtures.

U.S. Pat. No. 4,977,489 discloses a portable battery-operated lighting device having a flashlight section on one end, a fluorescent light section on the other end, and a hazard warning light section. This lighting device has a U-shaped configuration, with the fluorescent and warning light sections being pivotal at a 90° angle downwardly. This patent does not disclose a portable lighting device having a detachable flashlight and a night light.

U.S. Pat. No. 4,782,432 discloses a multi-function portable lighting device having a spotlight section, a fluorescent light section, and a strobe light section being housed in an elongated cylindrical transparent housing. This patent does not disclose a portable lighting device having a detachable flashlight and a night light.

The under cabinet lighting device having a detachable flashlight on one end, a night light on the other end, and a fluorescent light in the middle is structurally different from the prior art. None of the aforementioned patents teach such a combination of features and structure.

Accordingly, it is a primary object of the present invention to provide an under cabinet lighting fixture having a detachable flashlight component on one end of the housing, a night light with a photosensor on the other end, and a fluorescent light in the middle section for use at home, in a office, or at a work facility.

Another object of the present invention is to provide for an emergency light source which is battery operated and rechargeable and is detachable from one end of the main housing of an under cabinet lighting fixture.

Another object of the present invention is to provide for a night light fixture having a photosensor cell for automatically turning on the night light bulb when there is insufficient light in a room using the present invention.

Another object of the present invention is to provide for an under cabinet lighting fixture that is simple and easily installable, and is mounted to a cabinet bottom, or a counter bottom, or a wall area by a user.

A further object of the present invention is to provide for an under cabinet lighting fixture which can be mass produced in an automated and economical manner and is readily affordable by the consumer.

SUMMARY OF THE INVENTION

A lighting fixture for mounting under a cabinet or under a counter or on a wall area, including a housing having a device for mounting the housing under a cabinet or under a counter or on a wall area; a fluorescent light fixture mounted in the housing; a night light mounted in the housing; and a battery-operated detachable flashlight assembly removably mounted in the housing. The flashlight assembly includes a battery recharger, an electrical device, such as a male plug, for interconnecting the battery recharger and a power source, and an electrical device for sensing a power loss. The light fixture also includes a flashlight electrical connection in the housing, such as a plug receptacle, for connection to the male plug for supplying power from the power source to the detachable flashlight assembly; and one or more diffusers for the housing.

The light fixture of the first embodiment provides for the detachable flashlight assembly, fluorescent light fixture and night light component to be all mounted end-to-end in a straight line within the housing. The fluorescent light fixture is mounted between the flashlight assembly and the night light component. The housing of the first embodiment is U-shaped and includes means for detachably mounting the diffuser cover on the open side of the U-shaped housing.

The light fixture of the second embodiment provides for the fluorescent light fixture being mounted in a first compartment in parallel with a second compartment which houses the night light component and the detachable flashlight assembly. The housing is essentially rectangular having a center mounting wall and divider to form the first and second compartments. There are two diffuser covers for the second embodiment, a large one for the fluorescent light fixture and a smaller one for the night light component which is mounted on the rectangular housing.

BRIEF DESCRIPTION OF THE DRAWINGS

Further objects, features, and advantages of the present invention will become apparent upon consideration of the detailed description of the presently-preferred embodiments, when taken in conjunction with the accompanying drawings wherein.

DETAILED DESCRIPTION OF THE PREFERRED EMBODIMENT

FIGS. 1 through 9 show the first embodiment of the present invention which provides for an under cabinet or under counter lighting fixture 10 having the combination of a detachable flashlight assembly 80, a night light 140 and a fluorescent light fixture 160 contained within a housing 12. As shown in FIGS. 1, 2, 3, 4, and 6, the under cabinet/counter lighting fixture 10 includes a main housing 12 made of metal or plastic having a bottom wall 14, a front wall 16, a rear wall 24, and left and right end-cap walls 40 and 48. Housing 12 further includes an L-shaped mounting plate 54 having an integral left side wall 56.

Figure 1:
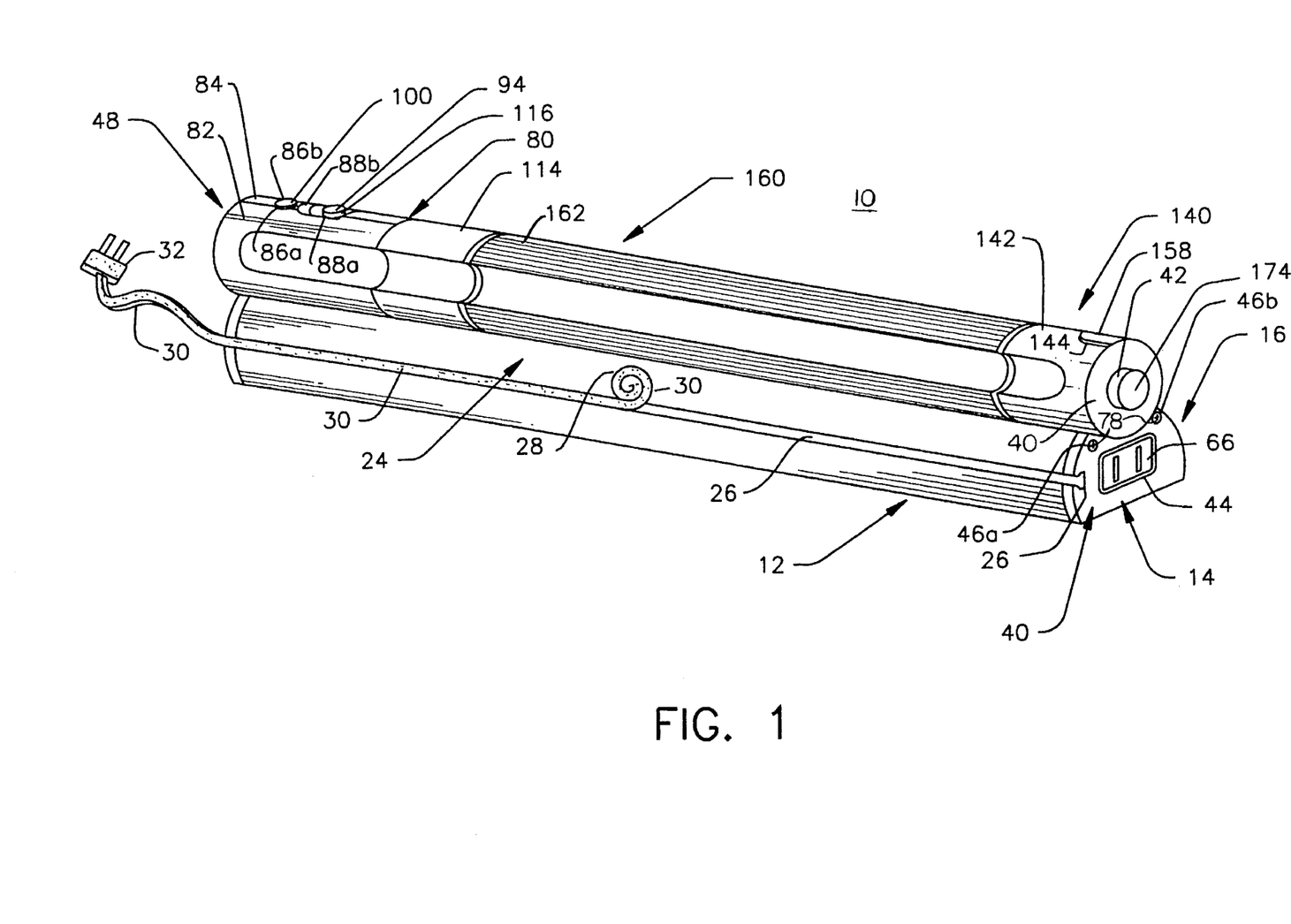
FIG. 1 is a rear perspective view of the first embodiment of the present invention showing the combination of a detachable flashlight, a night light with a photosensor, and a fluorescent light fixture contained within a single housing of the under cabinet lighting fixture.
Figure 2:
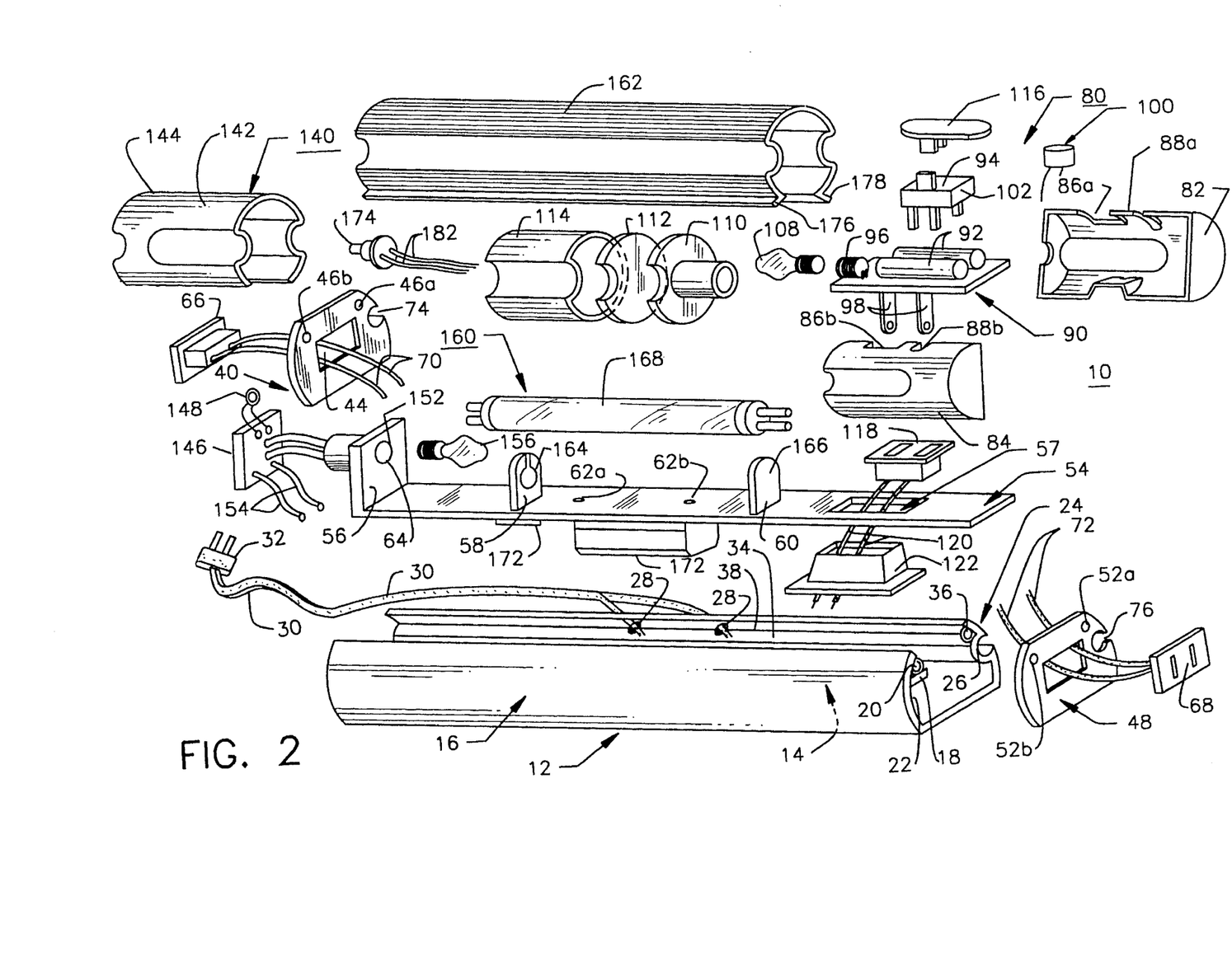
FIG. 2 is an exploded perspective view of the first embodiment of the present invention showing the major component parts contained therein.
Figure 3:
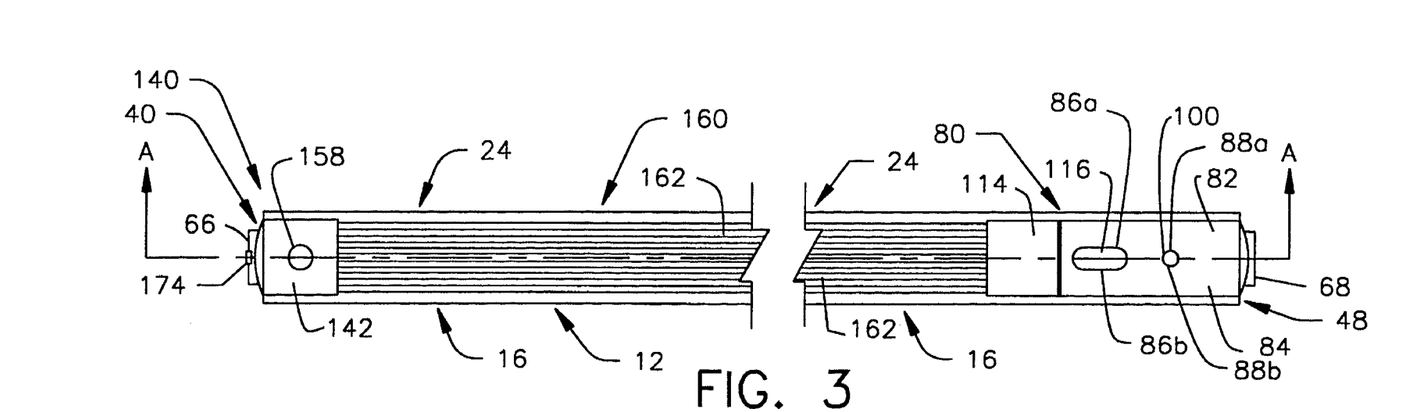
FIG. 3 is a top plan view of the first embodiment of the present invention showing an extended translucent acrylic diffuser for the fluorescent lighting fixture; a night light housing; and the lens cover and housing for the detachable flashlight assembly.
Figures 4, 5:
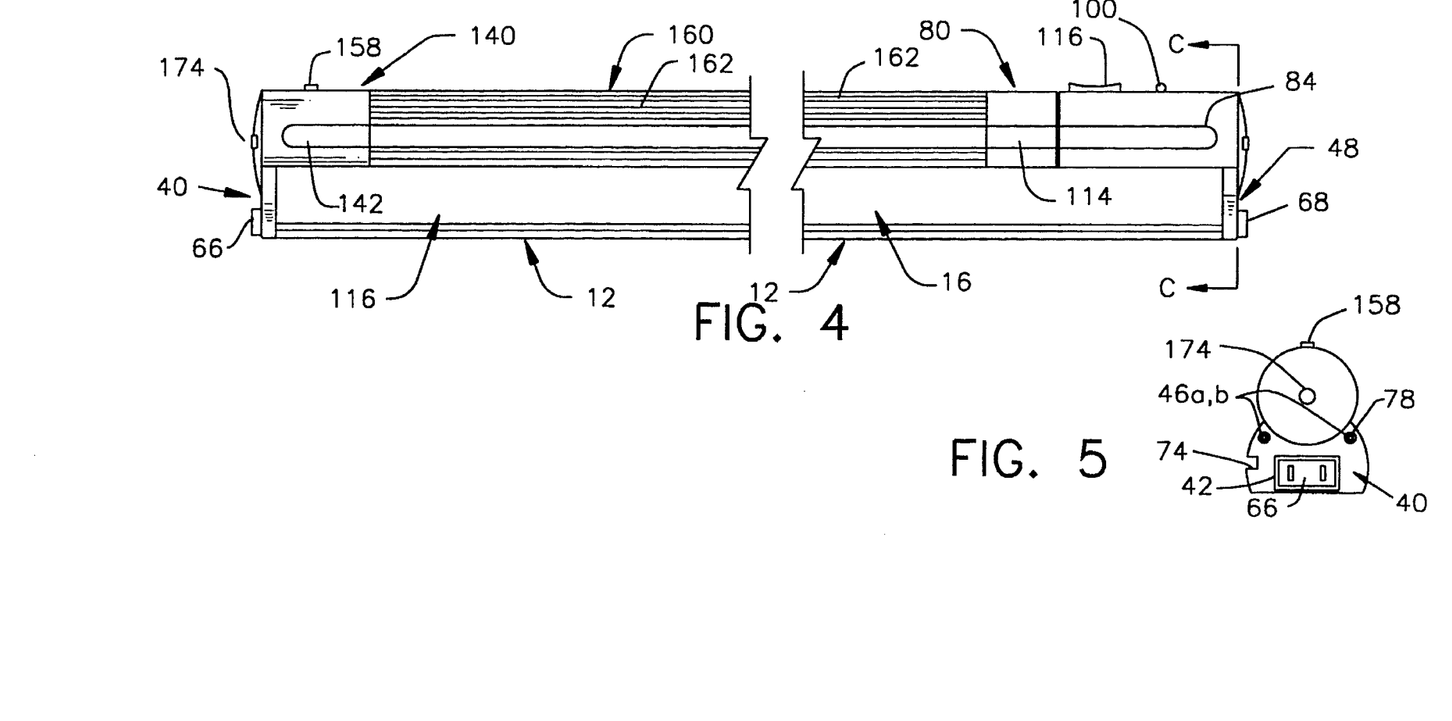
FIG. 4 is a front elevational view of the first embodiment of the present invention showing its various components.
FIG. 5 is left-side end view of the first embodiment of the present invention showing the night light's push button ON/OFF switch and a convenience female outlet plug.
Figure 6:
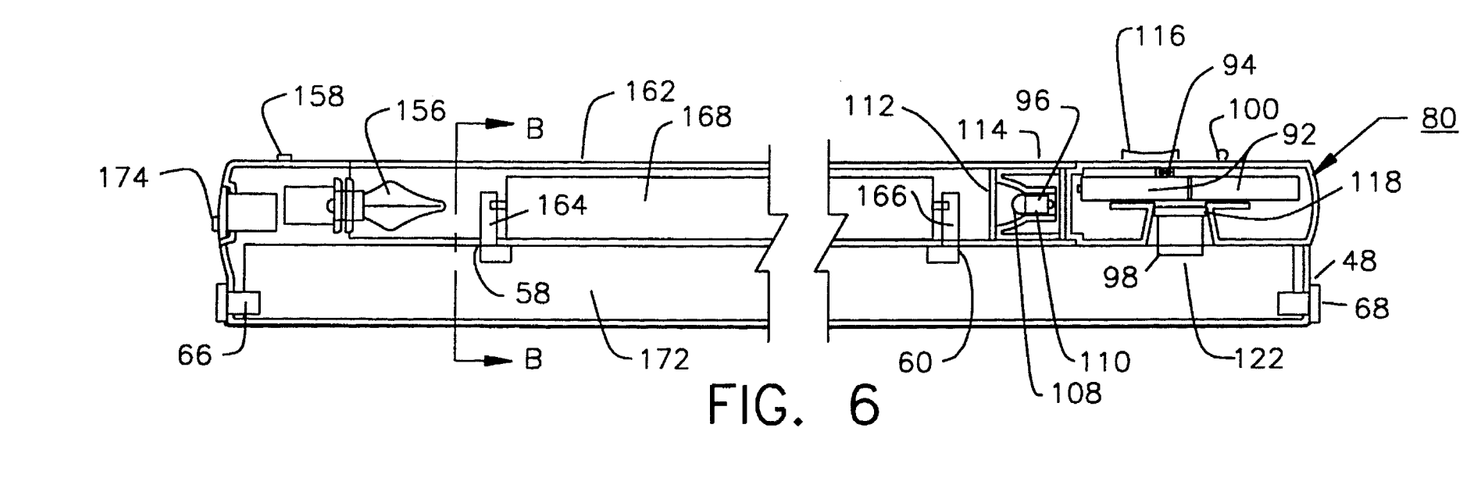
FIG. 6 is a vertical sectional view of the first embodiment of the present invention, taken along the sectional line A—A of FIG. 3, showing some of the components housed within the under cabinet lighting fixture.

Bottom wall 14 includes mounting openings 15a and 15b for mounting of housing 12 to a cabinet or counter bottom or wall area. Front wall 16 includes an integrally attached inside ridge 18 having end-cap attachment openings 20a and 20b where ridge 18 is centrally and longitudinally located on the inside wall 22. Rear wall 24 also includes an integrally attached inside ridge 34 having end-cap attachment openings 36a and 36b where ridge 34 is centrally and longitudinally located on the inside wall 38. Rear wall 24 further includes a wire retention groove 26 having an opening 28 for electrical wire 30 attached to a standard AC male plug 32, as shown in FIGS. 1, 2, and 6 of the drawings.

Left end-cap wall 40 includes an ON/OFF switch opening 42 for fluorescent light 160, a centrally located outlet plug opening 44 for a female convenience outlet plug 66, end-cap attachment openings 46a and 46b for fixedly attaching via screws 78 the end-cap 40 to openings 20a and 36a respectively of front and rear walls 6 and 24, and a wire retention opening 74 for electrical wire 30. Right end-cap wall 48 includes a centrally located outlet plug opening 50 for a female convenience outlet plug 68, end-cap attachment openings 52a and 52b for fixedly attaching via screws 78 the end-cap 48 to openings 20b and 36b respectively of front and rear walls 16 and 24, and a wire retention opening 76 for electrical wire 30.

Figure 9:
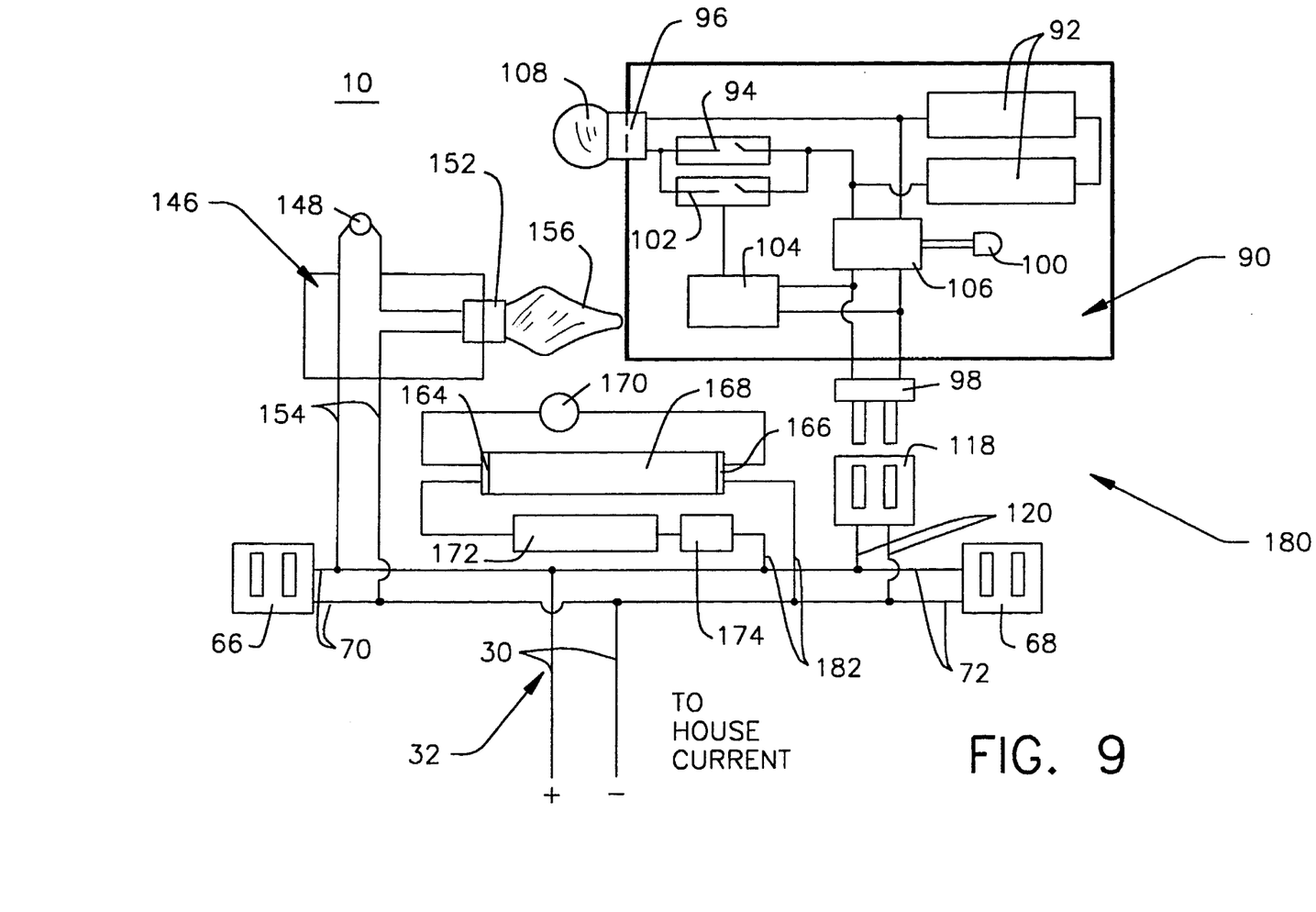
FIG. 9 is a circuit diagram for the first embodiment of the under cabinet lighting fixture showing the circuit wiring for the batteries, L.E.D. charging indicator light, various component ON/OFF switches, photo (light) sensor, power interruption detector, fluorescent transformer and starter, flashlight bulb, night light lamp, fluorescent lamp, female convenience outlet plugs and a male outlet plug.

Center mounting plate 54 includes an outlet plug opening 57 for the flashlight outlet plug 118; lamp socket attachment openings 58 and 60 for fluorescent lamp sockets 164 and 166; ballast attachment openings 62a and 62b for ballast/starter 170; and a night light socket opening 64 located on left side wall 56 of center mounting plate 54. The female convenience outlet plugs 66 and 68 have integrally attached electrical wires 70 and 72 for their appropriate electrical connections, as shown in FIGS. 2 and 9. The center mounting plate 54 is located and mounted on the inner ridges 18 and 34 of inner wall surfaces 22 and 38.

DETACHABLE FLASHLIGHT ASSEMBLY 80

The flashlight assembly 80, as shown in FIGS. 1, 2, 6, and 8, includes flashlight housing shell sections 82 and 84 having ON/OFF switch cut-out openings 86a and 86b and indicator light cutout openings 88a and 88b and male plug cut-out openings 89a and 89b. Flashlight assembly 80 also includes a printed circuit board 90 having connected nickel-cadmium batteries 92, an ON/OFF flashlight switch 94, a flashlight lamp socket 96, a male prong plug 98, an LED charging indicator light 100, an ON/OFF relay switch 102, a power interruption detector 104 and a recharger 106 for the nickel-cadmium batteries 92. Other components of flashlight assembly 80 include a flashlight lamp or bulb 108, a reflector housing 110, a lens 112, a lens cover housing 114, a switch cover 116, a flashlight plug receptacle 118 having electrical wire 120 attached thereto, and a flashlight retainer component 122. The flashlight assembly 80 is located to the left end of the under cabinet/counter lighting fixture 10 when mounted under the cabinet/counter or wall area.

NIGHT LIGHT ASSEMBLY 140

The night light assembly 140, as shown in FIGS. 2, 3, 4, 6, and 9, includes a night light housing cover 142 integrally connected to end-cap wall 40 having a photosensor opening 144 for photo (light) sensor 148. Night light assembly 140 further includes a printed circuit board 146 having an integrally connected photo (light) sensor 148, and a night light socket 152 having electrical connection wires 154. Other components of night light assembly 140 include a night light lamp bulb 156 and a photosensor lens 158. The night light assembly 140 is located to the right end of the under cabinet/counter lighting fixture 10 when mounted under the cabinet/counter or wall area.

FLUORESCENT LIGHT FIXTURE 160

Figure 7:
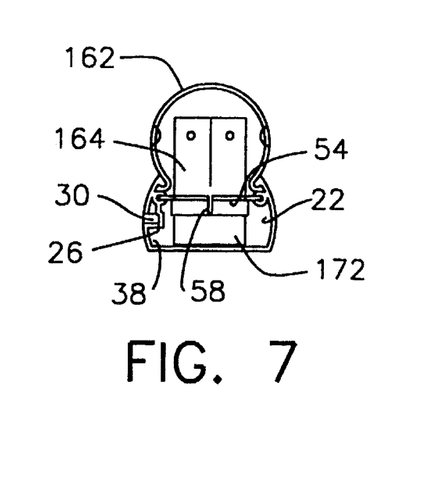
FIG. 7 is a vertical sectional view of the first embodiment of the present invention, taken along the sectional line B—B of FIG. 6, showing the fluorescent lamp socket and ballast/starter attached to the central mounting plate.
Figure 8:
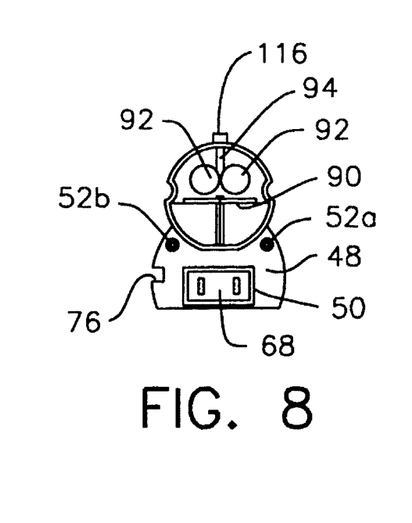
FIG. 8 is a vertical sectional view of the first embodiment of the present invention, taken along the sectional line C—C of FIG. 4, showing the rechargeable flashlight batteries and a convenience outlet plug.

Fluorescent light fixture 160, as depicted in FIGS. 1, 2, and 6 to 9, includes a translucent acrylic diffuser 162, fluorescent lamp sockets 164, 166, a fluorescent lamp 168, a ballast/starter 170, a transformer 172, and a manual ON/OFF switch 174. The fluorescent lamp sockets 164, 166, ballast/starter 170 and transformer 172 are fixedly attached to the center mounting plate 54 via opening 58, 60, 62a, and 62b, as shown in FIG. 2 of the drawings. Diffuser 162 has front and rear connection edges 176 and 178 for mounting the diffuser 162 to the front and rear inner wall surfaces 22 and 38 of housing 12, as shown in FIG. 7.

ELECTRICAL ARRANGEMENT 180

The electrical arrangement 180 of the first embodiment 10, as shown in FIG. 9, includes a standard AC male plug 32 connected to circuit wires 30 which are connected to circuit wires 70 and 72 for female outlet plugs 66 and 68, respectively. Circuit wires 30 also connect to circuit wires 120 which connect to flashlight outlet 118 for receiving male prong plug 98 attached to flashlight circuit board 90. Circuit board 90 also includes component connections for the batteries 92, a manual switch 94, a flashlight lamp socket 96 having bulb 108, a charging indicator light 100, an ON/OFF relay switch 102 which is turned on in a response to a power failure for switching to battery power, a power interruption detector circuit 104 for sensing a power failure and in response thereto, triggering said relay switch, and a battery recharger 106 for recharging nickel-cadmium batteries 92.

Circuit wires 30 connect to circuit wires 154 of night light circuit board 146. Circuit board 146 includes a photo (light) sensor 148 for detecting ambient light which turns on the night light bulb 156 at a specified lumens quantity, and a night light socket 152.

Circuit wires 30 further connect to circuit wires 182 for connection to the manual ON/OFF switch 174, the transformer 172, the starter 170, the lamp sockets 164 and 166 and the fluorescent lamp 168, respectively.

DETAILED DESCRIPTION OF THE SECOND EMBODIMENT

FIGS. 10 through 13 show the second embodiment of the present invention which provides for an under cabinet or under counter lighting fixture 200 having the combination of a flashlight 300, a night light 350 and a fluorescent light fixture 380 contained within a housing 202. As shown in FIGS. 10 through 13, the under cabinet/counter lighting fixture 200 includes a main housing 202 made of metal having a bottom wall 204, a front wall 212, a rear wall 222, a left side wall 238 and a right side wall 244. Housing 202 further includes an U-shaped center wall mounting component 250 having a top wall 252, a front side wall 260, a rear side wall 280, and a metal divider 345 for forming a separate compartment for the flashlight assembly 300 and night light component 350, and a parallel and separate compartment for the fluorescent fixture 380.

Figure 12:
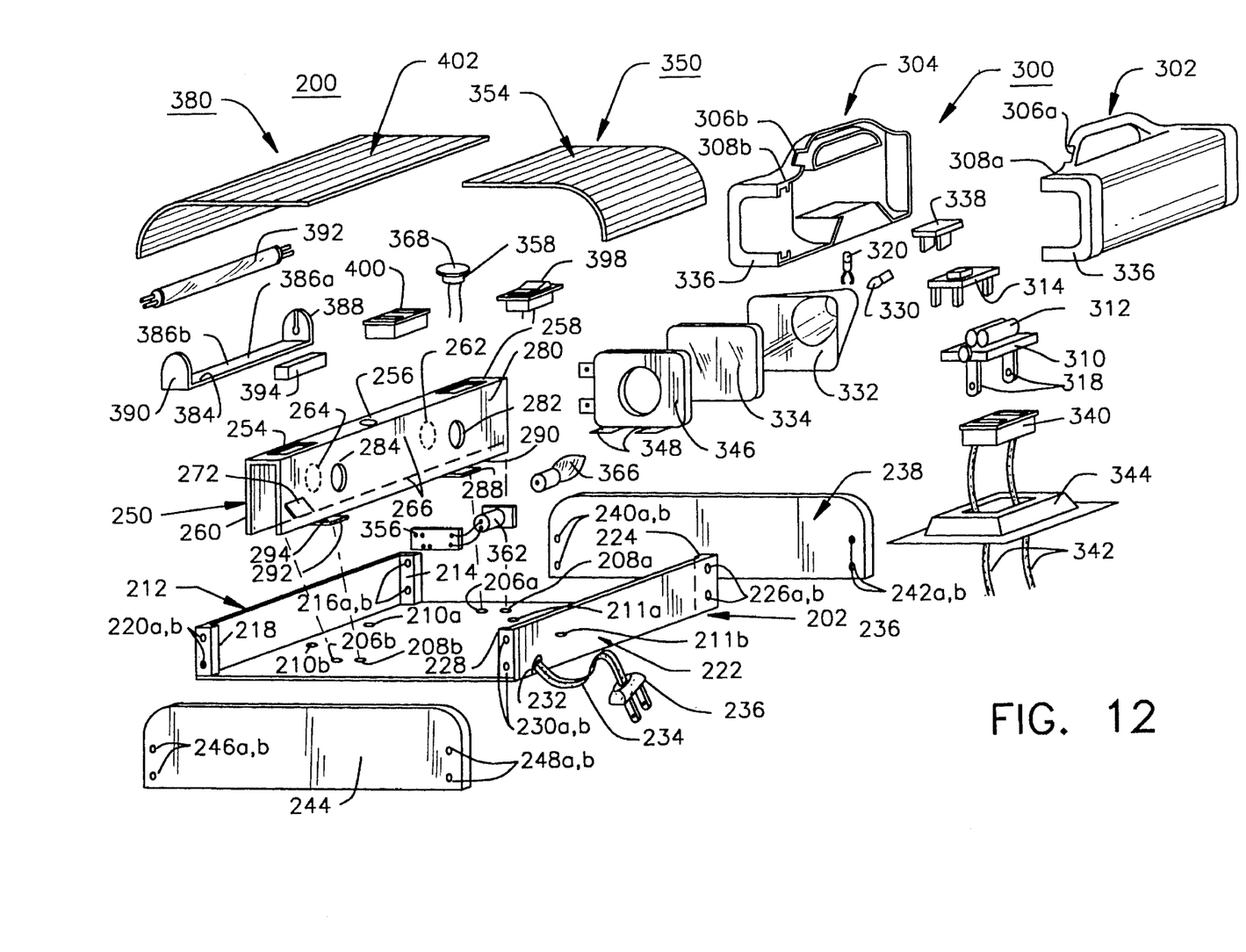
FIG. 12 is an exploded perspective view of the second embodiment of the present invention showing the major components contained therein.

Bottom wall 204 includes mounting openings 205a and 205b for mounting of housing 202 to a cabinet or counter bottom or wall area, and openings 206a, 206b, 208a, and 208b for receiving the front end rear wall 260 and 280 center wall flanges 268, 272, 288, and 292, respectively. Bottom wall 204 also includes openings 210a and 210 for attaching the fluorescent mounting plate 384 and openings 211a and 211b for attaching the metal divider bottom attachment flanges 348 of metal divider 345. Front wall 212 includes integrally attached connector flanges 214 and 218 having upper and lower flange openings 216a, 216b, 220a, and 220b, respectively. Rear wall 222 includes integrally attached connector flanges 224 and 228 having upper and lower flange openings 226a, 226b, 230a, and 230b, respectively. Flanges 214 and 224 connect the left side wall 238 to the front and rear walls 212 and 222 of housing 202 and correspondingly, flanges 218 and 228 connect the right side wall 244 to the front and rear walls 212 and 222 of housing 202, as shown in FIG. 12. Rear wall 222 further includes an opening 232 for electrical wire 234 having a standard AC male plug 236 connected thereto.

Figure 10:
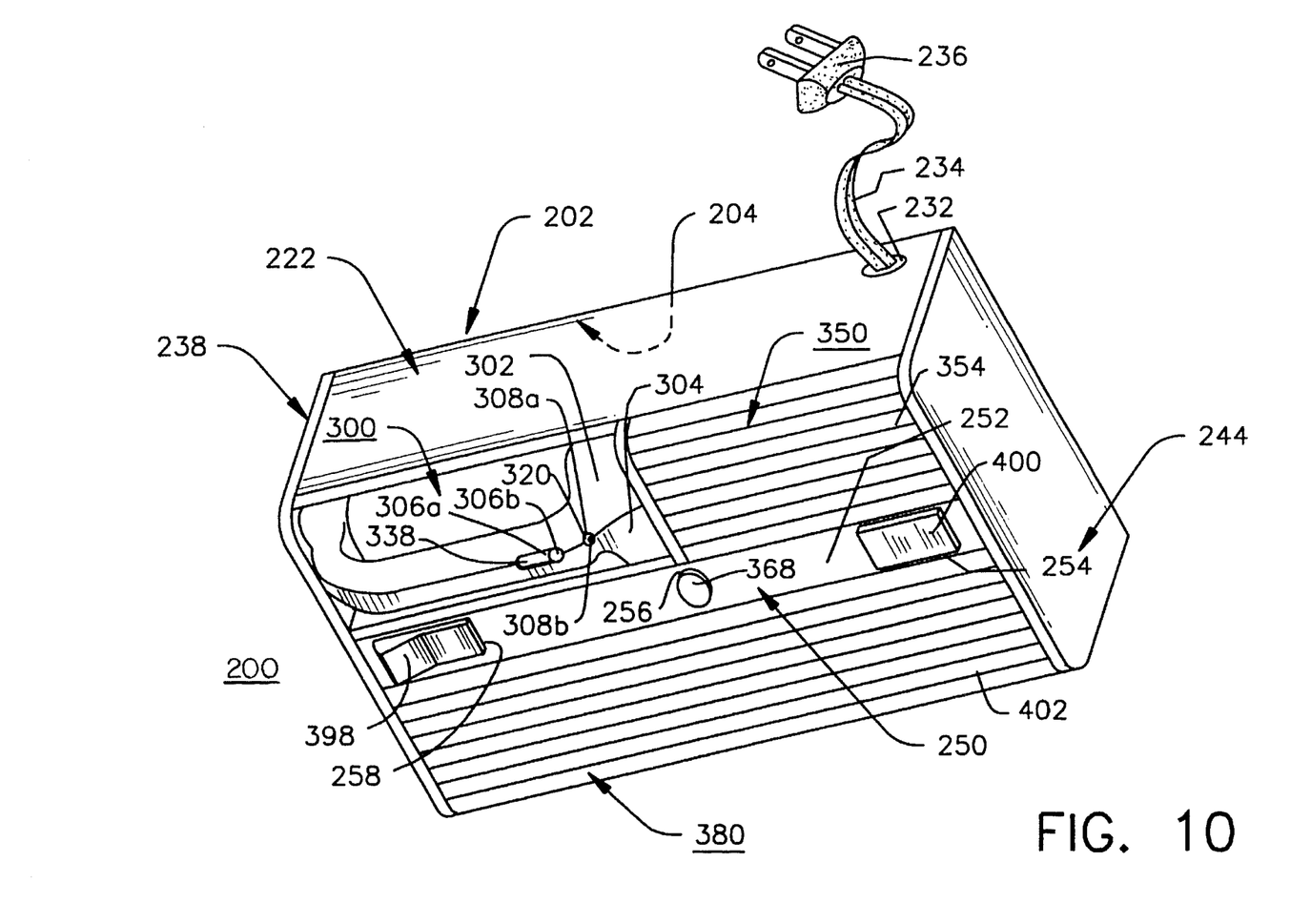
FIG. 10 is a rear perspective view of the second embodiment of the present invention showing the combination of a detachable flashlight, a night light with a photosensor, and a fluorescent light fixture contained within a single housing of the under cabinet lighting fixture.

Left side wall 238 includes front and rear corner perimeter attachment openings 240a, 240b, 242a, and 242b for attachment to the front and rear connector flanges 214 and 224 of the front and rear walls 212 and 222 of housing 202. Right side wall 244 includes front and rear corner perimeter attachment openings 246a, 246b, 248a, and 248b for attachment to the front and rear connector flanges 218 and 228 of the front and rear walls 212 and 222 of housing 202. The left and right side walls 238 and 244 are fixedly attached via metal screws 276 to the front and rear walls 212 and 222 with the alignment of the corner perimeter openings 240a, 240b, 242a, 242b, 246a, 246b, 248a, and 248b with connector flange openings 216a, 216b, 220a, 220b, 226a, 226b, 230a, and 230b, respectively. This assembly forms the housing 202 of light fixture 200, as depicted in FIGS. 10 and 11 of the drawings.

Top wall 252 of center mounting wall 250 includes an opening 254 for a female convenience outlet 400 for receiving a plug, an opening 256 for photosensor 358 centrally located on top wall 252, and an opening 258 for the fluorescent ON/OFF switch 398 being located at the other end of top wall 252. Front side wall 260 of center mounting wall 250 includes electrical wire openings 262 and 264; ballast attachment openings 266a and 266b; and integrally attached connector flanges 268, 272 having attachment openings 270 and 274 for connecting the front side wall 260 to bottom wall 204. Rear side wall 280 of center mounting wall 250 includes electrical wire openings 282 and 284; metal divider attachment openings 286a and 286b and integrally attached connector flanges 288 and 292 having attachment openings 290 and 294 for connecting the rear side wall 280 to bottom wall 204. The space between front side wall 260 and rear side wall 280 acts as an electrical wire conduit area 278 for circuit wires 234, 364, 404, and 406. In attaching the center mounting wall 250 to the bottom wall 204 via metal screws 276, the front and rear side wall connector flange openings 270, 272, 290, and 294 are aligned with bottom wall openings 206a, 206b, 208a, and 208b, respectively. In attaching the metal divider 345 to the center mounting wall 250 and the bottom wall 204, the metal divider's connector flange openings 347a, 347b, 349a, and 349b are aligned with the rear wall attachment openings 286a and 286b and bottom wall attachment openings 211a and 211b, respectively. This assembly forms the compartments 302, 352, and 382 for the flashlight assembly 300, the night light component 350 and fluorescent light fixture component 380 respectively, within housing 202 of lighting fixture 200, as shown in FIG. 11 of the drawings.

DETACHABLE FLASHLIGHT ASSEMBLY 300

Figure 11:
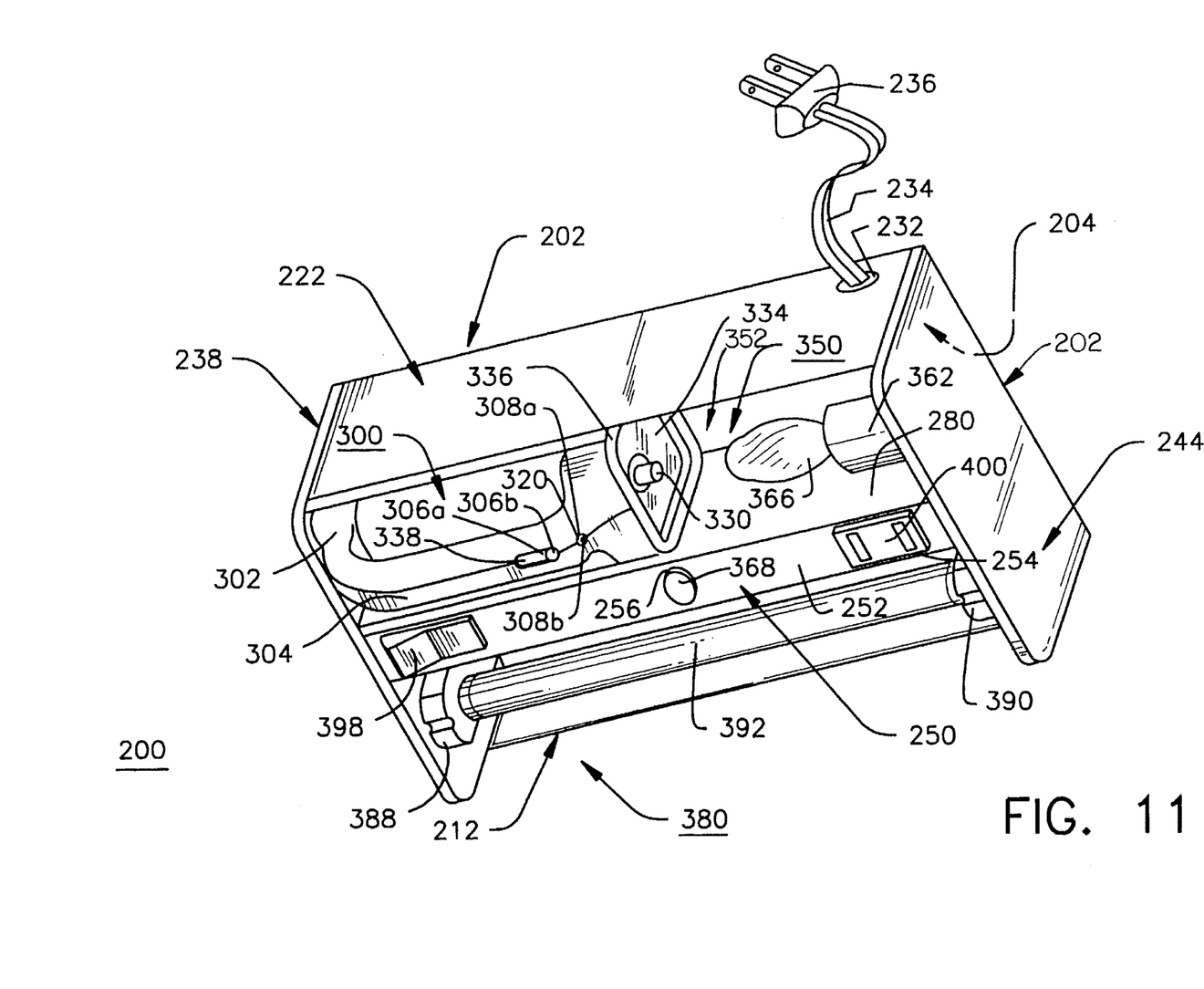
FIG. 11 is a rear perspective view of the second embodiment of the present invention showing some of the internal components of the under cabinet lighting fixture.

The flashlight assembly 300 is housed in compartment 382, as shown in FIGS. 11 and 12, and includes flashlight housing shell sections 304a and 304b having ON/OFF cut-out openings 306a and 306b, indicator light cut-out openings 308a and 308b, male plug cut-out openings 328a and 328b and handle sections 309a and 309b. Flashlight assembly 300 also includes a printed circuit board 310 having connected nickel-cadmium batteries 312, an ON/OFF switch 314, a flashlight lamp socket 316, a male prong plug 318, an LED charging indicator light 320, an ON/OFF relay switch 322, a power interruption detector circuit 324 and a recharger 326 for the nickel-cadmium batteries 312. Other components of flashlight assembly 300 include a flashlight lamp bulb 330, a reflector housing 332, a lens 334, a lens cover housing 336, a switch cover 338, a flashlight plug receptacle 340 having electrical wire 342 attached thereto, and a flashlight retainer component 344. The flashlight assembly 300 is located in one corner area 302 adjacent to rear wall 222 of housing 202 for fixture 200 when mounted under a cabinet/counter or wall.

NIGHT LIGHT ASSEMBLY 350

The night light assembly 350 is located in compartment 352, as shown in FIGS. 10 to 13. The night light assembly 350 includes a night light housing cover 354 fixedly attached to the inside surface 245 of rear wall 244. Night light assembly 350 further includes a printed circuit board 356 having an integrally connected photo (light) sensor 358, and a night light socket 362 having electrical connection wires 364. Other components of night light assembly 350 include a night light lamp bulb 366 and a photosensor lens 368. The night light assembly 350 is located next to the metal divider 345 and adjacent to rear wall 222 of the under cabinet/counter lighting fixture 10 when mounted under the cabinet/counter or wall area.

FLUORESCENT LIGHT FIXTURE 380

Fluorescent light fixture 380 is located in compartment 382, as shown in FIGS. 11 to 12. Fluorescent light fixture 380 includes a mounting plate 384 having attachment openings 386a and 386b for mounting on bottom wall 204 via screws 276 to openings 210a and 210b. Mounting plate 384 includes integrally connected fluorescent lamp sockets 388 and 390 having a fluorescent lamp attached thereto. Fluorescent light fixture 380 also includes a ballast/starter 394, a transformer 396, a manual ON/OFF switch 398, a female convenience outlet plug 400 having circuit wires 406, and a translucent diffuser cover 402. Ballast/starter 394 and transformer 396 are attached to the front side wall 260 of center wall 250 via screw 276 to mounting openings 266a and 266b, respectively. Switch 398 and convenience plug 400 are mounted within hole openings 258 and 254 of center mounting wall 250, respectively. Diffuser cover 402 is mounted on edge 213 of front wall 212 and edge 251 of front side wall 260. The fluorescent light fixture 380 is adjacent to both front wall 212 and front side wall 260, as shown in FIG. 11.

ELECTRICAL ARRANGEMENT 410

Figure 13:
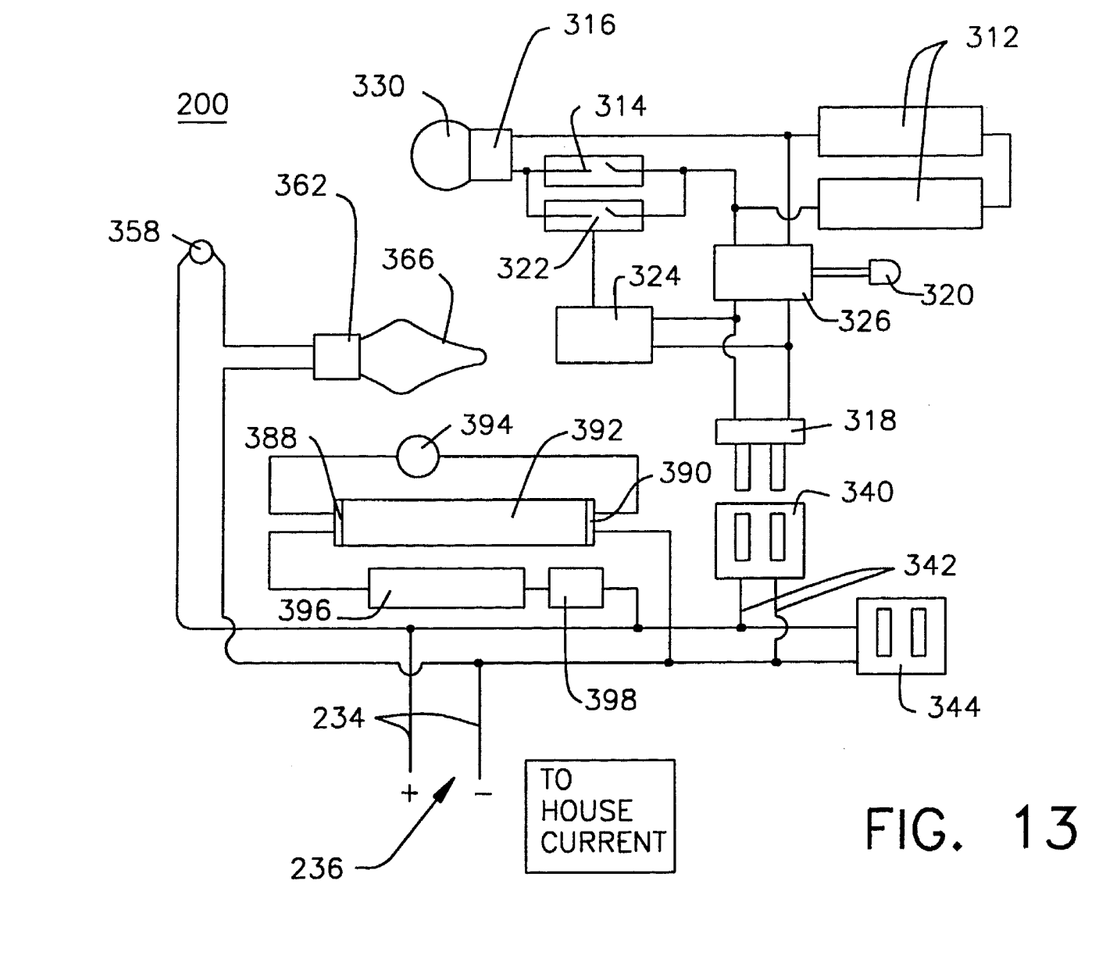
FIG. 13 is a circuit diagram for the second embodiment of the under cabinet lighting fixture showing the circuit wiring for the various components.

The electrical arrangement 410 of the second embodiment 200, as shown in FIG. 13, includes a standard AC male plug 236 connected to circuit wires 234 which are connected to circuit wires 406 for female outlet plug 400. Circuit wires 234 also connect to circuit wires 342 which connect to flashlight outlet 340 for receiving male prong plug 318 attached to flashlight circuit board 310. Circuit board 310 also includes component connections for the batteries 312, a manual switch 314, a flashlight lamp socket 316 having bulb 330, a charging indicator light 320, an ON/OFF relay switch 322 which is turned on in a response to a power failure for switching to power, a power interruption detector circuit 324 for sensing a power failure and in response thereto, triggering said relay switch, and a battery recharger 326 for recharging nickel-cadmium batteries 312.

Circuit wires 234 connect to circuit wires 364 of night light circuit board 356. Circuit board 356 includes a photo (light) sensor 358 for detecting ambient light which turns on the night light bulb 366 at a specified lumens quantity, and a night light socket 362.

Circuit wires 234 further connect to circuit wires 404 for connection to the manual ON/OFF switch 398, the transformer 396, the ballast/starter 394, the lamp sockets 388 and 390, and the fluorescent lamp 392, respectively.

ALTERNATIVE EMBODIMENTS

The first and second embodiments 10 and 200 of the present invention may have alternative battery recharging electrical connections wherein male plug 98 or 318 is replaced with first contact points 98' or 318'; and wherein flashlight plug receptacle 118 or 340 is replaced with second contact points 118' or 340'. In this manner, the detachable flashlights 80 or 300 may be recharged using the present invention's rechargers 106 or 326 by first contact points 98' or 318' engaging and electrically contacting second contact points 118' or 340', respectively.

Alternatively, the detachable flashlight 80 or 300 may be recharged by the use of a battery recharger mounted anywhere in the housing, such that the first contact points 98' or 318' of flashlights 80 or 300 are electrically contacted with the contact points of the battery recharger to recharge batteries 92 or 312. In addition, the battery recharger is connected to the power source.

OPERATION AND INSTALLATION OF THE PRESENT INVENTIONS 10 AND 200

When a power failure occurs, the power interruption detector circuit 104 or 324 senses this loss of power and causes the ON/OFF relay switch 102 or 322 to move to the ON position. This switches the power source to batteries 92 or 312 for activating the flashlight assembly 80 or 300, which instantly illuminates the unlighted area, and allows the flashlight 80 or 300 to be removed from the housing carrying its own batter operated power source. Prior to a power failure, operation of the LED charging indicator light 100 and 320 shows that the power source of batteries 92 or 312 is charging.

To install the housing 12 or 202 of the lighting fixtures 10 and 200, it is only necessary to mount the bottom wall 14 or 204 via screws through mounting openings 15a, 15b, or 205a and 205b respectively, to a counter/cabinet bottom surface or wall space, and then connect the standard male plug 32 or 236 to a standard AC plug receptacle within a room.

The night light 140 and 350 is not energized by this AC connection until the photocell 148 or 358 activates the night light which illuminates the night light bulb 156 or 366. Also, the fluorescent light 160 or 380 is not activated by this AC connection until the switch 174 or 398 for the fluorescent light is activated. In addition, the flashlight assembly 80 or 300 is not activated by this AC connection until switch 94 or 314 is activated, or until there is a power failure, at which time it is automatically turned on and powered by the batteries.

ADVANTAGES OF THE PRESENT INVENTION

Accordingly, a primary advantage of the present invention is that it provides for an under cabinet lighting fixture having a detachable flashlight assembly on one end of the fixture housing, a night light with a photosensor on the other end, and a fluorescent light in the middle section for use at home, in a office, or at a work facility.

Another advantage of the present invention is that it provides for an emergency light source which is battery operated and rechargeable, and is detachable from one end of the main housing of the under cabinet lighting fixture.

Another advantage of the present invention is that it provides for a night light fixture having a photosensor cell for automatically turning on the night light bulb when there is insufficient light in a room using the present invention.

Another advantage of the present invention is that it provides for an under cabinet lighting fixture that is simple and easily mounted to a cabinet bottom, or a counter bottom, or a wall area by a user.

A further advantage of the present invention is that it provides for an under cabinet lighting fixture which can be mass produced in an automated and economical manner and is readily affordable by the consumer.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A lighting fixture for mounting on a surface, comprising:

a) a housing including means for mounting said housing on a surface;

b) a fluorescent light fixture mounted in said housing;

c) a night light mounted in said housing;

d) a battery-operated detachable flashlight assembly removably mounted in said housing and including a battery recharger, means for interconnecting said battery recharger and a power source, and means for sensing a power loss;

e) a flashlight electrical connection in said housing for connection to said means for interconnecting for supplying power from the power source to said battery recharger; and f) one or more diffusers for said housing.

2. A lighting fixture in accordance with claim 1, wherein said housing includes at least one convenience plug receptacle for receiving the male plug of an appliance or another fixture.

3. A lighting fixture in accordance with claim 1, wherein said housing includes an electrical plug for inserting into a conventional electrical outlet for supplying power to said lighting fixture.

4. A lighting fixture in accordance with claim 1, wherein said means for interconnecting in said flashlight assembly is an electrical male plug, and wherein said flashlight electrical connection is a plug receptacle for receiving said male plug.

5. A lighting fixture in accordance with claim 1, wherein said housing includes a photosensor for activating said night light.

6. A lighting fixture in accordance with claim 1, wherein said fluorescent light fixture, said night light and said detachable flashlight assembly are all mounted end-to-end in a straight line in said housing.

7. A lighting fixture in accordance with claim 6, wherein said fluorescent light fixture is mounted between said night light and said detachable flashlight assembly.

8. A lighting fixture in accordance with claim 1, wherein said fluorescent light fixture is mounted in a first compartment parallel with said night light and said detachable flashlight assembly which are mounted in a second compartment.

9. A lighting fixture in accordance with claim 1, wherein said housing is U-shaped in cross section and includes means for detachably mounting said diffuser on the open side of said U-shaped housing.

10. A lighting fixture in accordance with claim 1, further including a charging indicator light in said housing for indicating that said detachable flashlight assembly is being charged.

11. A lighting fixture in accordance with claim 1, wherein said means for sensing a power loss includes an electrical relay for switching to battery power to energize said flashlight assembly, and a power interruption detector circuit for sensing a loss of power and in response thereto, triggering said electrical relay to switch to battery power.

12. A lighting fixture in accordance with claim 1, further including a circuit board in said housing for housing said battery recharger.

13. A lighting fixture in accordance with claim 1, wherein said fluorescent fixture includes a starter and a transformer.

14. A lighting fixture in accordance with claim 1, wherein said detachable flashlight assembly includes a handle for removing said flashlight assembly from said housing.

15. A lighting fixture for mounting on a surface, comprising:

a) a housing including means for mounting said housing on a surface;

b) a fluorescent light fixture mounted in said housing;

c) a battery-operated detachable flashlight assembly removably mounted in said housing and including means for connecting to a battery recharger, and means for sensing a power loss;

d) a battery recharger in said housing;

e) a flashlight electrical connection in said housing for connection to said means for connecting for supplying power from the power source to said battery recharger;

f) said means for sensing a power loss includes an electrical relay for switching to battery power to energize said flashlight assembly to provide emergency light, and a power interruption detector circuit for sensing a loss of power and in response thereto, triggering said electrical relay to switch to battery power; and g) one or more diffusers for said housing.

16. A lighting fixture in accordance with claim 15, wherein said means for connecting in said flashlight assembly is an electrical male plug, and wherein said flashlight electrical connection is a plug receptacle for receiving said male plug.

17. A lighting fixture in accordance with claim 15, wherein said housing includes a night light and a photosensor for activating said night light.

18. A lighting fixture in accordance with claim 17, wherein said fluorescent light fixture, said night light and said detachable flashlight assembly are all mounted end-to-end in a straight line in said housing.

19. A lighting fixture in accordance with claim 18, wherein said fluorescent light fixture is mounted between said night light and said detachable flashlight assembly.

20. A lighting fixture in accordance with claim 17, wherein said fluorescent light fixture is mounted in a first compartment parallel with said night light and said detachable flashlight assembly which are mounted in a second compartment.

* * * * *